March 29, 1932.   F. FLADER   1,851,623

COMBINED SHOCK ABSORBER AND WHEEL BRAKE FOR AIRCRAFT

Filed May 2, 1929

Inventor
Fredric Flader
by Barton A. Beau Jr.
Attorney

Patented Mar. 29, 1932

1,851,623

UNITED STATES PATENT OFFICE

FREDRIC FLADER, OF BUFFALO, NEW YORK

COMBINED SHOCK ABSORBER AND WHEEL BRAKE FOR AIRCRAFT

Application filed May 2, 1929. Serial No. 359,864.

This invention relates to the aeronautic art and primarily to means or devices for facilitating the landing and stopping of aircraft.

In the landing of aeroplanes and during taxiing maneuvers on the ground it is desirable to avoid excessive shocks both for the comfort of passengers as well as for the good of the aircraft. This has led to the adoption of shock absorbing means of various forms and structures embodying rubber cushions, springs, and other mediums capable of absorbing shocks and violent jars. If the craft is equipped with fluid pressure shock absorbers the fluid is frequently spent on the initial landing shock and thereafter is incapable of accommodating the rapidly succeeding shocks incidental to land travel. Auxiliary means have had to be provided such as springs, rubber cushions, rubber tension cords, and air under pressure to accommodate such shocks. The satisfactory arrest of the craft after landing has also been a problem. Various forms of brake mechanisms have been utilized to arrest the land travel of an aeroplane, as by braking the wheels of the landing gear, but none can be called ideal. Furthermore, the functioning of the shock absorbers and brakes have heretofore been entirely separate and distinct from each other, requiring separate installations and equipments.

An object of the present invention is to provide a hydraulic shock absorber and brake for aircraft which will perform the dual function of absorbing shocks and applying the brake in a satisfactory and effective manner.

A further object of the invention is to provide a shock absorber which is efficacious in absorbing the initial shock of the aeroplane when landing as well as the shocks incidental to the traveling of the aeroplane on the ground, as when taxiing.

The invention also has for its objects to provide a combined shock absorber and braking mechanism, each mechanism of the combination acting on the fluid pressure or hydraulic principle and having a common fluid supply; to provide an assembly of mechanisms of this character which will be operable by and during movement of the craft on the ground, following the initial landing contact; to provide a shock absorber in which the spent shock absorbing fluid is transferred to its active location by mechanism set in operation when the aeroplane is in running engagement with the ground; to provide a shock absorber with a pump-controlled transfer of the shock absorbing fluid from an inoperative location to an operative location; and to provide an improved braking action whereby the motion of the landing wheels coact with a control in effecting the application of the brake. The invention further resides in incorporating a pump in the absorber mechanism, convertible into a braking motor or engine for creating a braking effect.

The invention is found to reside further in the salient features of construction and the novel and simple arrangements and combinations of parts hereinafter described, reference being had to the accompanying drawings wherein, Fig. 1 is a vertical sectional view, partly in elevation, through the combined shock absorber and braking equipment.

Figure 1:
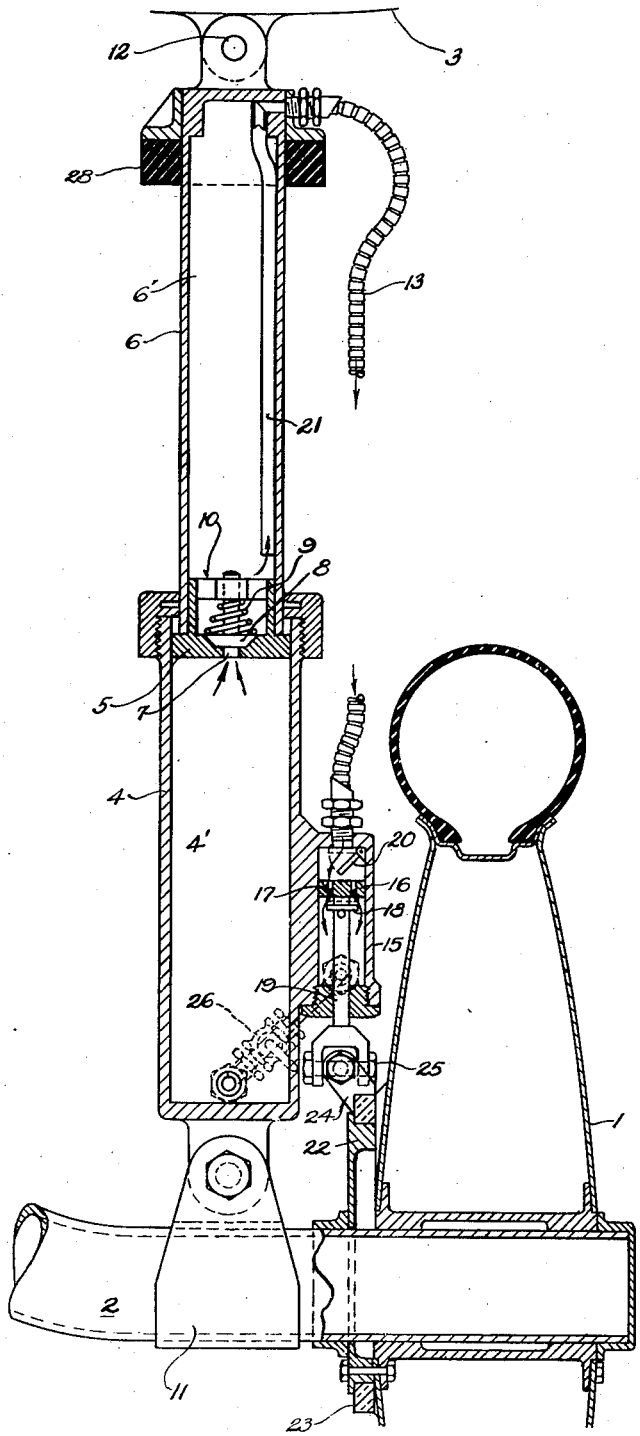
Figure 2:
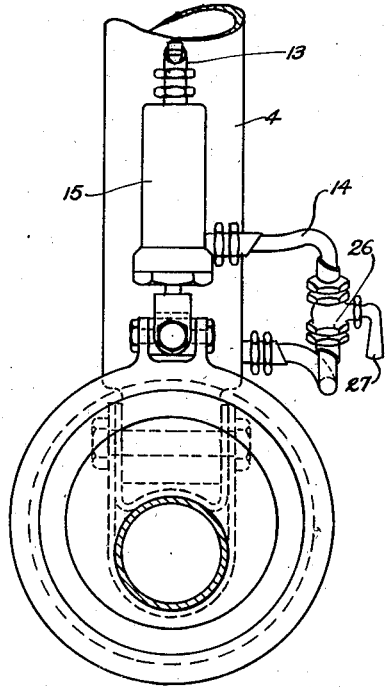
Fig. 2 is a transverse section through the axle disclosing, in fragmentary elevation, the shock absorbing brake mechanism.

Primarily the invention comprises a shock absorber having a fluid by-pass by which the shock absorbing fluid is transferred from an inactive location to an active location, interposing a positive drive for the transmission of the fluid through the by-pass, which drive is operated from the landing wheels, and then controlling the by-pass area to restrict the flow of the by-passed fluid for setting up a resistance to the actuation of the fluid drive from the landing wheels, thereby tending to arrest the aircraft.

Referring more particularly to the construction as exemplified in the drawings, the numeral 1 designates one of the landing wheels which is depicted as being of the disc type of wheel and mounted on the axle 2 the latter being movable relative to the fuselage 3 of the aeroplane, as when accommodating shocks and jars.

Interposed between the fuselage and the wheel-carrying portions of the axle is a plurality of shock absorbers, one of which is herein illustrated. This shock absorber is of the fluid type and preferably embodies a cylinder 4 and a valved piston 5 having a chambered rod 6 extending outwardly through the upper end of the cylinder 4. The head of the piston is provided with an orifice or port 7 normally closed by a valve 8 which opens into the chamber 6' of the rod, a spring 9 being interposed between the valve and a spider 10 to permit unseating of the valve when the spring pressure is overcome by the fluid pressure in the cylinder. The chamber 4' of the cylinder, which is initially full of oil or other shock absorbing fluid, constitutes the active fluid chamber while the chamber 6' serves as the inactive fluid chamber, the two chambers having intercommunication through the port 7.

The cylinder 4 is attached to the axle 2, as by means of a clip 11, while the upper end of the plunger is connected to the fuselage as indicated generally at 12, the connections between the shock absorber and the aircraft being of a pivotal or universal character to permit the proper functioning of the accessory. As the aeroplane wheel comes in contact with the ground the body of the aircraft will move downwardly towards the ground and so cause the piston 5, responsive to the shock, to telescope into the cylinder 4. Consequently the active fluid will be spent through the valved piston, past the valve 8, and into the inactive chamber 6'. The spent fluid in chamber 6' is then returned by means of a by-pass about the piston so as to replenish the supply in the active fluid chamber 4'. This by-pass is herein illustrated as comprising a flexible hose or conduit 13, leading from the upper part of chamber 6', and a more or less rigid conduit 14 leading to the lower end of the active chamber.

Interposed in the by-pass is a device for impelling the fluid so as to effect a positive return of the same to the cylinder. In the form indicated the device consists of a pump embodying a cylinder 15 which may be integrally carried by the cylinder 4 and to the upper end of which the flexible conduit 13 is connected, while from the lower portion thereof communication is established with the conduit 14 for the outflow of the fluid back to the active chamber 4'. Operating within the pump cylinder 15 is a valved piston 16 having one or more ports 17 passing therethrough so as to permit the fluid to pass from above the piston to below the same. A valve 18 is slidably mounted on the piston rod 19 to close the port 17 upon the downward movement of the piston within the cylinder 15. The entrance of the flexible conduit 13 into the cylinder is controlled by a valve 20 which opens upon the downward movement of the piston 16 and closes upon the upward movement thereof in alternation with the action of the valve 18. Consequently, as the piston 16 moves upwardly the valve 20 will close to trap the fluid within the cylinder 15 above the piston, and the valve 18 will unseat whereby the trapped fluid will make its escape through the port 17 to a point beneath the piston so that upon the down stroke of the piston such transferred fluid will find its escape through the conduit 14 into the lower part of the cylinder 4, the valve 18 closing immediately upon the start of the downward travel of the piston while the valve 20 opens so as to admit a fresh quantity of fluid to the cylinder above the piston. In order to insure a more or less constant supply of fluid for the flexible conduit 13, there is provided in the chamber 6' an inlet pipe 21 which communicates with the flexible conduit 13 at the upper end of the chamber 6' and extends downwardly within the latter to a point adjacent the bottom of said chamber where it will normally be submerged.

The fluid-transmitting pump is set in operation only when the landing wheels have contact with the ground and therefore the wheels can serve as a drive for the pump. To accomplish this a pump operating mechanism is provided comprising an oscillating means or eccentric 22 secured to the wheel 1 to revolve therewith, a strap 23 cooperating with the eccentric 22 and having an arm 24 to which the piston rod 19 is connected as by means of a universal joint generally indicated at 25. With this construction the landing wheel, when rolling on the ground, will translate its rotary motion into a reciprocatory motion which is imparted to the piston 16 to thereby create a forced flow of fluid through the by-pass 13, 14. Thus, the spent fluid is returned under pressure to the cylinder 4 and will act to distend or project the piston 5 from the cylinder so that as the aeroplane continues its travel over the ground the subsequent shocks incidental to such travel will be accommodated and absorbed by the fluid as it makes its further escape through the restricted orifice 7 in the fluid circuit. This restricted escape is, of course, further retarded by the spring-seated valve 8 which latter serves to retain the fluid within the chamber 6' from which it is pumped by the piston 16.

Figure 3:
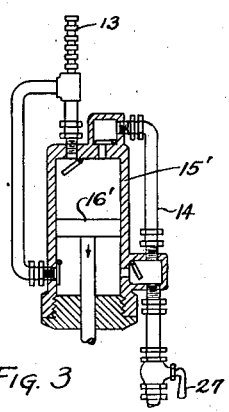
Fig. 3 is a sectional showing of a double acting pump as a modification of the single acting pump Fig. 1.

In Fig. 1 the pump is illustrated as being of the single acting type, while in Fig. 3 I have illustrated a double acting pump with a valved inlet and a valved outlet in each end of the cylinder 15' whereby a more uniform braking action, now to be described, is obtained, the piston 16' lacking any fluid-transfer passages.

Within the by-pass there is positioned a braking device herein illustrated as being a simple form of valve 26 which may be controlled by the operator of the aircraft from a remote point although an operating handle 27 will suffice for the present illustration. The valve is located in the conduit 14 and by manipulating the valve control 27 the passage through the valve will be accordingly varied either to restrict or enlarge the same and permit less or more fluid to flow through the conduit. As the flow is restricted by adjusting the valve to throttle the conduit 14, a resistance is built up in opposition to the piston 16 sufficient to retard the movement of the piston and thereby apply a braking force to the wheel as transmitted through the strap to the eccentric. Obviously, upon completely closing the valve 26 the piston 16 will be fluid-locked against further movement, as urged by the landing wheel and the aircraft will be brought to a stop. With the single acting pump of Fig. 1 the braking resistance will be offered only in one direction of movement of the piston, the downward movement, while with the double acting pump of Fig. 3 the braking resistance will be uniform and consistent throughout both strokes of the pump.

In operation, with the aircraft in the air, the parts of the shock absorber, namely cylinder 4 and rod 6 are extended as far as is possible by the weight of the wheels, which position is necessary and suitable for absorbing the initial landing shock, and immediately upon landing a shock-absorbing action is set up, the cylinder 4 telescoping its piston. The action of the oil passing through orifice 7 creates a hydraulic resistance which absorbs the shock of landing and dissipates the energy of the falling aircraft. The amount of energy to be absorbed is a function of the force of the impact on the landing wheels. The greater the energy to be absorbed the faster will piston 5 be forced downwardly into cylinder 4, and the more friction will be created by the faster passage of oil through orifice 7. This is the shock absorption means, having to do strictly with the absorption of the initial or landing shock. Should this initial shock be excessive, an auxiliary absorber, more in the nature of a rubber buffer 28, is provided on the outer end of the piston rod 6 for contacting with the upper end of the cylinder.

Following the initial landing impact, and while the aircraft is moving over the ground, the shocks incidental to such land travel will likewise be absorbed in a similar manner. But with the expulsion of the fluid from the active chamber as a result of the initial contact, the shock-responsive part of the absorber would lack a cooperating supply of active fluid were it not for prompt replenishment as provided by the pump. The pump, however, having been placed in operation by the landing wheels rolling on the ground, will quickly replenish the supply of active fluid. This pumping of oil back to chamber 4' causes the piston 5 to rise and so lift the weight of the aeroplane in the same manner as would a compression spring. The degree of pressure exerted on valve 8 by spring 9 is to be adjusted so that the valve will not open until a pressure in the orifice 7 is developed, corresponding to a unit weight of the plane. The pumping up of piston 15 causes a reserve of oil to be stored in cylinder 4 for taxiing shocks experienced by the plane on the ground. Whenever a shock equal or greater than its own weight is experienced the valve 8 opens and oil again flows through orifice 7 and so absorbs the shocks. Oil is constantly being maintained in cylinder 4 by piston 16 so long as the aircraft is moving. This function just described is for the absorption of taxiing or rolling shocks as distinct from the initial shock of landing, and the means for so doing eliminates auxiliary means such as steel springs, rubber discs or rubber tension cords.

In applying the brakes, the valve 26 is adjusted to gradually restrict the fluid flow to create a hydraulic or fluid resistance to the travel of piston 16. The valve 26 is preferably set to its restrictive position immediately after landing. Upon take off of the plane, this valve is set at full throttle to permit free passage of fluid from the pump to the cylinder 4' so as not to interfere with the substantially free rotation of the wheel. For this purpose the hand valve 27 of the valve 26 is controlled from the cockpit of the plane (not shown) in any suitable manner. In other words, a valve controlled hydraulic or fluid pressure brake is provided having a fluid supply in common with the shock absorber. Throttling the fluid circuit through the valve 26 converts the pump 15, 16, into a braking motor and transmits the resistance thereof to the eccentric strap.

The shock absorber supplies fluid for the brake actuation, and the brake comes into function when there is little or no need of a shock absorber because of the slow motion of the aircraft. Considering the hydraulic brake feature, the shock absorber serves as a supply tank for the fluid circuit thereof.

While I have gone into this description with much detail, it obviously is not my intention of limiting myself to any specific disclosure, the scope of the invention being defined in the appended claims.

What is claimed is:

1. A combined hydraulic shock absorber and wheel brake for aircraft, comprising a shock absorber having two fluid chambers, one an active fluid chamber and the other an inactive fluid chamber, said absorber having a movable shock-responsive part which spends its energy on the fluid in the active chamber and transmits the fluid to the inactive chamber, a by-pass by which the fluid is returned from the inactive chamber to the active chamber, a pump interposed in the by-pass for impelling the fluid from the inactive chamber to the active chamber, a drive for the pump operable by and during movement of the wheels of the aircraft and manually operable valve in the by-pass for resisting the impelling action of the pump to selectively increase or decrease the braking action of the pump and accompanying drive on the wheels of the aircraft.

2. In an absorber for use on aircraft having a landing gear including landing wheels, a combined hydraulic brake and hydraulic shock absorber comprising oscillating means movable by its wheel, a cylinder and piston assembly having one of its elements responsive to fluid pressure and connected with said oscillating means to be actuated thereby, a fluid circuit including the assembly and adapted to have the fluid thereof impelled by said responsive element, and manually operable valve means in the circuit for retarding the flow of fluid therethrough whereby the braking action of the assembly and accompanying oscillating means on the wheel may be selectively increased or decreased.

3. In combination with the fuselage and landing gear of an aircraft having a landing wheel, an eccentrically mounted part on the wheel to be moved thereby, a cylinder and piston assembly having an element connected to said part for being moved thereby as the wheel tracks on the ground, a shock absorber interposed between the fuselage and the landing gear and consisting of a movable shock-transmitting member operable in a fluid-containing chamber, a conduit receiving spent fluid from said chamber for conveying it to the cylinder, a second conduit connecting the cylinder to the absorber chamber for having fluid forced therethrough by the piston to replenish the supply in said chamber, valves acting to direct the fluid flow from said cylinder to said chamber and manually operable valve means in one of said conduits for selectively restricting the same.

4. An accessory for aircraft having landing wheels, comprising an oscillating drive means on one of the wheels, a fluid circuit embodying a cylinder and a piston one of which is movable, an operative connection between said drive means and the movable element of said cylinder and piston assembly, and a manually operable valve for restricting the flow of fluid in the circuit to provide a fluid resistance to the movable element of said assembly, whereby the braking effect of the piston and accompanying drive means on the wheel may be selectively increased or decreased.

5. In an aircraft having yieldably mounted landing wheels, intercommunicating active and inactive chambers with a shock-receiving member movable in the active chamber, said member and active chamber being connected one to the axle of the landing wheels and the other to the body of the aircraft, said active chamber to contain fluid transmissible under pressure of said member to the inactive chamber, a by pass connecting the two chambers around said member, an eccentric carried by a landing wheel for rotation therewith, a strap in which the eccentric has rotative bearing for imparting movement laterally of the wheel axle, a chamber located in the by-pass into which and out of which the fluid flows from the inactive chamber to the active chamber, a piston connected to the strap and operable thereby in the by-pass chamber to impel the fluid therethrough, and manually operable means to restrict the flow of fluid from said by-pass chamber toward the active chamber to build up a fluid braking resistance in opposition to the movement of said piston and thereby resist the movement of the wheel-carried eccentric.

6. In an aircraft having yieldably mounted landing wheels, intercommunicating active and inactive chambers with a shock-receiving member movable in the active chamber, said member and active chamber being connected one to the axle of the landing wheels and the other to the body of the aircraft, said active chamber to contain fluid transmissible under pressure of said member to the inactive chamber, a by-pass connecting the two chambers around said member, an eccentric carried by a landing wheel for rotation therewith, a strap in which the eccentric has rotative bearing for imparting movement laterally of the wheel axle, a chamber located in the by-pass into which and out of which the fluid flows from the inactive chamber to the active chamber, a piston connected to the strap and operable thereby in the by-pass chamber to impel the fluid therethrough, a valved port through the piston operating to effect the desired directional flow of fluid through the by-pass, and a manually operable braking valve interposed in the by-pass between the active chamber and the by-pass chamber for throttling the fluid flow.

7. In an absorber for use on aircraft having a landing gear including landing wheels, a pair of relatively movable shock absorbing members, pump means operable by the movement of the wheels on the ground for returning the shock absorbing members to their operative position after the shock has been absorbed, and manually operable means for restricting the action of the pump to selectively increase or decrease the braking load of the pump on the wheels.

FREDRIC FLADER.